United States Patent
McFarland et al.

(10) Patent No.: US 6,697,013 B2
(45) Date of Patent: Feb. 24, 2004

(54) RADAR DETECTION AND DYNAMIC FREQUENCY SELECTION FOR WIRELESS LOCAL AREA NETWORKS

(75) Inventors: William McFarland, Sunnyvale, CA (US); Chaohuang Zeng, Sunnyvale, CA (US); Deepak Dhamdhere, Sunnyvale, CA (US)

(73) Assignee: Atheros Communications, Inc., Sunnyvale, CA (US)

( * ) Notice: Subject to any disclaimer, the term of this patent is extended or adjusted under 35 U.S.C. 154(b) by 92 days.

(21) Appl. No.: 10/039,451

(22) Filed: Dec. 31, 2001

(65) Prior Publication Data

US 2003/0107512 A1 Jun. 12, 2003

Related U.S. Application Data

(60) Provisional application No. 60/337,319, filed on Jun. 12, 2001.

(51) Int. Cl.$^7$ ................................................ G01S 13/86
(52) U.S. Cl. ........................ 342/159; 342/162; 370/332; 455/436
(58) Field of Search ................................. 342/159, 162; 370/332, 333; 455/63.1, 296, 403, 436

(56) References Cited

U.S. PATENT DOCUMENTS

| | | | | |
|---|---|---|---|---|
| 5,933,420 A | | 8/1999 | Jaszewski et al. | 370/329 |
| 5,990,833 A | | 11/1999 | Ahlbom et al. | 342/417 |
| 6,122,261 A | * | 9/2000 | Fernandes et al. | 370/320 |
| 6,127,976 A | * | 10/2000 | Boyd et al. | 342/463 |
| 6,615,074 B2 | * | 9/2003 | Mickle et al. | 600/509 |
| 2002/0155811 A1 | * | 10/2002 | Prismantas et al. | 455/63.1 |
| 2003/0032993 A1 | * | 2/2003 | Mickle et al. | 607/60 |
| 2003/0036374 A1 | * | 2/2003 | English et al. | 455/403 |
| 2003/0095517 A1 | * | 5/2003 | Proctor, Jr. | 370/332 |

OTHER PUBLICATIONS

"60 GHz radio channel in the research experiment network", Lyubchenko, V.E.; Zaitsev, N.M.; Volkov, V.N.; Microwaves, Rada and Wireless Communications, 2002. MIKON–2002. 14th Int'l Conference on , Vol: 1 , May 20–22, 2002 Ps: 100–102.*

"Antenna–coupled detector arrays in millimeter–wave indoor LAN", Lyubchenko, V.E.; Zaitsev, N.M.; Microwaves, Radar and Wireless Communications. 2000. MIKON–2000. 13thInternational Conference on , Vol: 2 , May 22–24, 2000 Ps: 686–688.*

(List continued on next page.)

*Primary Examiner*—John B. Sotomayor
(74) *Attorney, Agent, or Firm*—Dergosits & Noah LLP (57) ABSTRACT

A system for detecting and avoiding interference with radar signals in wireless network devices is described. The receiver circuit of the device receives incoming 5 GHz traffic. Such traffic could comprise both WLAN traffic as well as radar signals from radar systems. The incoming packets are treated as an input event, and are screened to be examined as radar pulses. Radar pulses are identified using the length of the detected event. The radar pulses are examined using frequency domain analysis, and the packet train is examined to find gaps between radar pulses. The periodic nature of the packet is determined using frequency domain and time domain analysis to calculate the period of the pulse train. Particular intervals within the pulse train are analyzed using threshold numbers of periodic pulses within the interval and threshold power levels for the pulses. The calculated period information is used to identify the radar source and screen non-radar traffic.

19 Claims, 7 Drawing Sheets

OTHER PUBLICATIONS

IEEE Std 802.1h/DO.1, Jul. 2001, Draft Supplement to Standard for Telecommunications and Information Exchange Between Systems—LAN/MAN Specific Requirements—Part 11: Wireless Medium Access Control (MAC) and physical layer (phy) specifications: Spectrum and Transmit Power Management extensions in the 5GHz band in Europe Attachment 4 from Oct. 8B Chairman's Report, Characteristics of and protectio criteria for radiolocation, aeronautical radionavigation and meterological radars operating in the frequency bands between 5 250 and 5 850 MHz Draft Revision to Document 8A–9B/89–E, Oct. 19, 2001, Radiocommunication Study Groups, International Telelcommunications Union.

IEEE P802 Radio Regulations—01/026r2, Nov. 2001, Proposed changes to Working Document Towards A Preliminary Draft New Recommendation on Dynamic Frequency Selection in 5GHz RLANS.

IEEE 802.11–01/081R2, 15/072–R1, Jan. 2001, Proposed Position Paper, Liaison statement on the compatibility between.

IEEE 802.11a and radars in the Radiolocation andRadionavigation service in the 5250–5350 MHz and 5470–5725 MHz bands.

* cited by examiner

|  EVENT  |  TIME  |
| :---: | :---: |
| 1 | T1 |
| 2 | T2 |
| 3 | T3 |
| 4 | T4 |
| 5 | T5 |

| DESCRIPTION | NAME | SIGNAL 1 VALUE | SIGNAL 2 VALUE | SIGNAL 3 VALUE |
|---|---|---|---|---|
| PULSE REPETITION FREQUENCY- PULSES PER SECOND | FREQ | 700 | 1800 | 330 |
| TOTAL NUMBER OF PULSES IN THE BURST. IT DETERMINES TOTAL TIME WIDTH OF THE BURST | TOTALNUMPULSES | 18 | 5 (MIN OF 5, 10) | 165 (MIN OF 165, 500) |
| SCAN RATE, SILENT TIME (SECONDS) BETWEEN TWO RADAR SWEEPS. CURRENTLY UNUSED. | SILENTPERIOD | 10 | 2 | 144 |
| HOW MANY PULSES DOES IT TAKE FOR A POSITIVE IDENTIFICATION. CHANGE SENSITIVITY. 4 OR 5 IS A GOOD VALUE | MINPULSESTODETECT | 4 | 4 | 4 |
| FINER SEARCH FOR SURROUNDING FREQUENCIES, STARTING VALUE. MORE STEPS, MORE CPU USED. | STEPFROM | 699 | 1790 | 329 |
| FINER SEARCH, INCREMENT | STEPINCR | 1 | 5 | 1 |
| FINER SEARCH, LAST VALUE | STEPTO | 701 | 1810 | 331 |
| FIRST PASS PERCENTAGE MARGIN, SHOULD TYPICALLY COVER THE VARIATION OF FINER FREQUENCIES. VALUE IS PERCENTAGE * 10. CHANGE SENSITIVITY. | WIDEMARGIN | 40 (4%) | 40 | 40 |
| SECOND PASS PERCENTAGE MARGIN. VALUE IS PERCENTAGE * 10. CHANGE SENSITIVITY. | NARROWMARGIN | 10 (1%) | 10 | 10 |

RADAR DETECTION AND DYNAMIC FREQUENCY SELECTION FOR WIRELESS LOCAL AREA NETWORKS

This application claims the benefit of Provisional application No. 60/337,319 filed Jun. 12, 2001.

FIELD OF THE INVENTION

The present invention relates generally to wireless networks, and more specifically to a system for detecting radar signals using dynamic frequency selection.

BACKGROUND OF THE INVENTION

Wireless Local Area Network (WLAN) devices must coexist with radar in the 5 GHz frequency bands. Interference mitigation techniques are required to enable WLAN devices to share these frequency bands with radar systems. The general requirement is that these devices detect interference, identify the radar interfering sources, and avoid using the frequencies used by the radar. Dynamic Frequency Selection (DFS) is used as a spectrum sharing mechanism by certain standards committees that define rules dictating the use of the 5 GHz space. For example, the European Telecommunications Standards Institute (ETSI), which is involved in developing standards for Broadband Radio Access Networks (BRAN), requires that transceiver equipment for use in HIPERLAN (High Performance Radio Local Area Networks) employ DFS mechanisms to detect interference from other systems to enable avoidance with co-channel operations with these other systems, notably radar systems. The goal is to provide a uniform spread of equipment loading across a number of channels, such as fourteen channels of 330 MHz each, or 255 MHz each for equipment used only in bands 5470 MHz to 5725 MHz.

Present proposals from the ETSI BRAN committee provide various simple guidelines for radar detection. These include detecting and avoiding radar signals that only appear at a level above a certain pre-defined threshold, such as −62 dBm. In one implementation, detection is based on a simple algorithm to see whether there are any instances of signals above the −62 dBm threshold during a ten second startup listening period. Another proposed guideline is that detection during normal operation should be addressed by periodically suspending all network traffic and listening in startup mode for any instances of signals above the −62 dBm threshold level.

Despite the simple guidelines proposed by the present standards committees, the radar and satellite industries increasingly expect 5 GHz WLAN devices to detect radar signals during normal operation. Thus, WLAN stations will need to detect radar when they are both transmitting LAN packets, and when they are idle. This will increase the chance of quickly detecting radar sources that are passing through an area of operation of the WLAN device, and thereby reduce interference with such radar sources.

However, the present proposed methods of radar detection and avoidance within the 5 GHz space present certain disadvantages, especially in view of increased network traffic in the 5 GHz radio spectrum, and the need for increased bandwidth among WLAN devices. For the simple threshold check method proposed by the ETSI BRAN committee, a significant disadvantage is the possibility of detecting false positive readings if threshold levels for signal detection are set too low. Another disadvantage includes the inability to effectively distinguish overlapping cells that may be operating co-channel during a measurement period. Moreover, with regard to WLAN equipment operation, the requirement to detect radar signals during normal LAN operation by periodically suspending network traffic can place a significant burden on the processing and data transfer capacity of these devices.

What is needed therefore, is a system that efficiently and accurately identifies radar in a WLAN device, and allows the device to switch frequency channels without imposing an undue burden in traffic processing throughput. Other objects, features, and advantages of the present invention will be apparent from the accompanying drawings and from the detailed description that follows below.

BRIEF DESCRIPTION OF THE DRAWINGS

The present invention is illustrated by way of example and not limitation in the figures of the accompanying drawings, in which like references indicate similar elements, and in which.

SUMMARY OF THE PRESENT INVENTION

A system for detecting and avoiding interference with radar signals in 5 GHz frequency bands is described. In one embodiment, the receiver circuit of a wireless LAN (WLAN) device receives incoming 5 GHz traffic. Such traffic could comprise both WLAN traffic as well as radar signals from radar systems. The incoming packets are treated as an input event, and are screened to be examined as radar pulses. Radar pulses are identified using the length of the detected event. The radar pulses are examined using frequency domain analysis, and the packet train is examined to find gaps between radar pulses. The periodic nature of the packet is determined using frequency domain and time domain analysis to calculate the period of the pulse train. Particular intervals within the pulse train are analyzed using threshold numbers of periodic pulses within the interval and threshold power levels for the pulses. The calculated period information is used to identify the radar source and screen non-radar traffic. In one embodiment, network load reduction schemes are used to provide increased time to measure and analyze the incoming signal pulses. These schemes include the use of beacons to clear traffic for a period of time, increasing time between packets in the network, and reducing the load after preliminary detection is found.

DETAILED DESCRIPTION OF THE PREFERRED EMBODIMENT

A radar detection and avoidance system for wireless network devices is described. In the following description, for purposes of explanation, numerous specific details are set forth in order to provide a thorough understanding of the present invention. It will be evident, however, to one of ordinary skill in the art, that the present invention may be practiced without these specific details. In other instances, well-known structures and devices are shown in block diagram form to facilitate explanation. The description of preferred embodiments is not intended to limit the scope of the claims appended hereto.

Aspects of the present invention may be implemented within the hardware circuitry and/or software processes of a WLAN or Radio LAN (RLAN) device operating in the 5 GHz space. For purposes of the following discussion, the terms "Wireless LAN" and "Radio LAN" are used interchangeably to refer to a network for a device or devices that transmit in the 5 GHz space. Such a device could be an Access Point (AP), mobile terminal (node), or some other station within a greater wireless network. The wireless network device is configured to receive network traffic from other WLAN devices. However, it can also receive unwanted signals from other sources, such as a radar source operating in the same frequency bands. These signals represent interference, and in the case of radar signals, the wireless device must take measures to avoid transmitting on the same frequency bands as the interfering radar sources.

Figure 1:
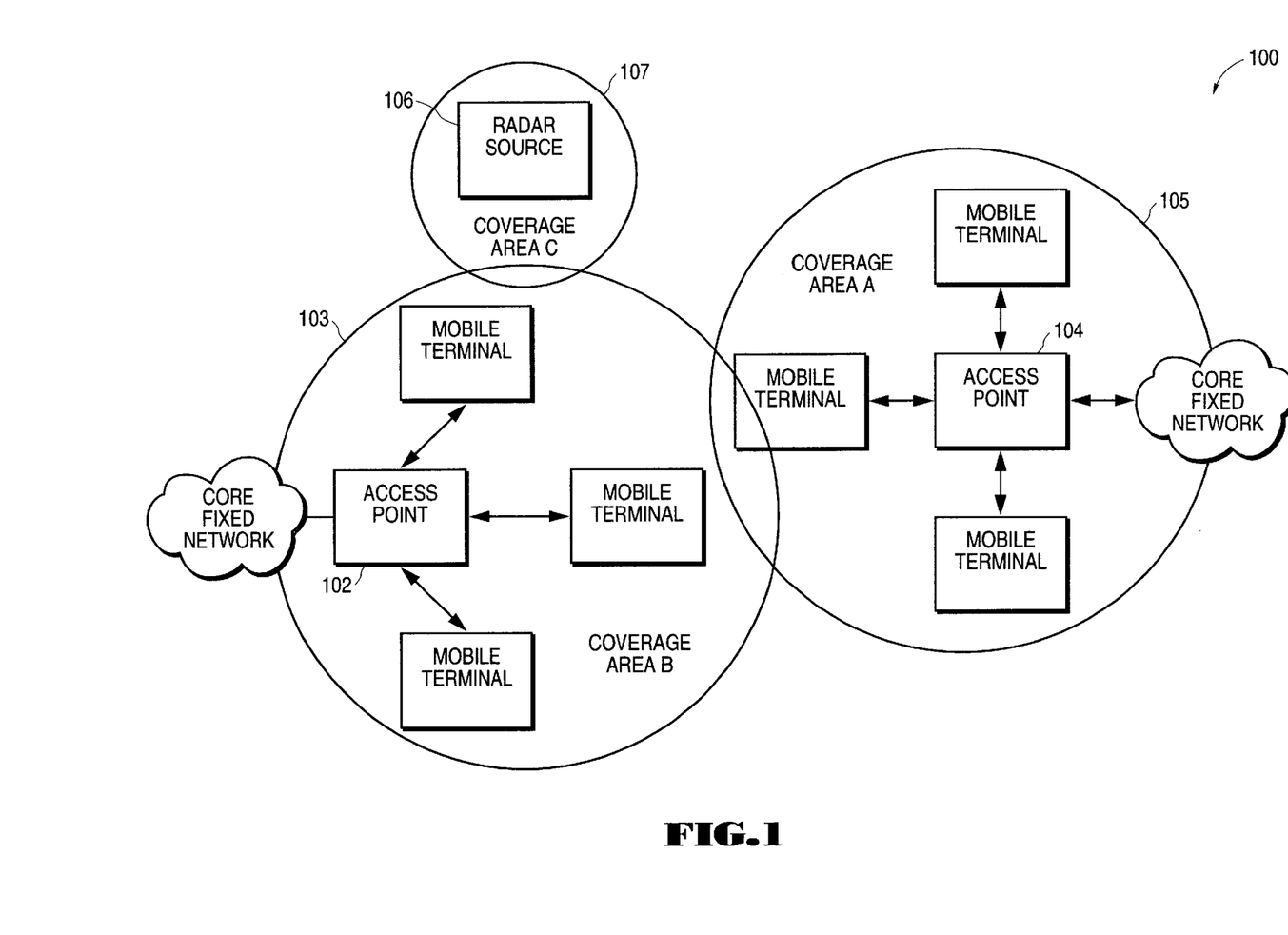
FIG. 1 illustrates a wireless LAN network comprising two WLAN Access Point networks and a potentially interfering radar source.

FIG. 1 illustrates the coverage area overlap and interference problems associated with 5 GHz WLAN systems. In system 100, two independent networks 103 and 105 are installed near to each other. Within their respective coverage areas, access points (AP) 102 and 104 provide access to a fixed backbone network such as an Ethernet LAN or an IEEE 1394 network. Each network 103 and 105 also includes a number of mobile terminals (MT) wirelessly coupled to their respective network access points. Each mobile terminal can associate and dissociate with access points in the radio coverage area. The two radio coverage areas A and B are shown to overlap, thus illustrating the possibility of interference between the WLAN devices (mobile terminals and/or access points) in the coverage areas. The core fixed networks for the access points are in general not the same, and therefore there is no coordination between the two independent coverage areas. Digital Frequency Selection (DFS) within each independent wireless network may be used to control the radio frequency to allow independent WLANs to co-exist in overlapping zones. DFS techniques allow each access point to choose a frequency with sufficiently low interference; and other mechanisms, such as Transmission Power Control (TPC) reduces the range of interference from terminals, increasing spectral efficiency via more frequent channel re-use within a given geographic area.

As illustrated in FIG. 1, a radar system 107 comprising a radar source 106 operating in coverage area C may also overlap one or more of the coverage areas operated by an access point. The radar source could be a fixed radar source, such as a radar transmitter, or it could be a mobile radar source, such as an airplane. The overlap between coverage area C and coverage area B illustrates potential radar interference with the WLAN traffic between access point 102 and its respective mobile terminals. In one embodiment of the present invention, access point 102 includes a radar detection and avoidance system that enables the WLAN system 103 to detect the interfering radar signals, possibly identify the radar source 106 (if its signature or profile is known), and switch to a channel that is free of the radar interference.

Radar Detection Method

For system 100 in FIG. 1, access point 102 includes a radar detection system that detects the presence of interfering radar signals. It is assumed that the access point equipment operates in the frequency ranges of 5.15 GHz to 5.35 GHz. This frequency range is generally divided into ten channels of 20 GHz each. Of these, typically eight are available for use by the access point. Upon initialization, for a given channel, the access point listens to detect whether any radar signals are present. If a radar signal is present, the access point WLAN device switches to another channel, until it finds one that is free of radar signal traffic. This allows the dynamic selection of frequencies within the 5 GHz frequency space to avoid interfering with radar sources.

Figure 2:
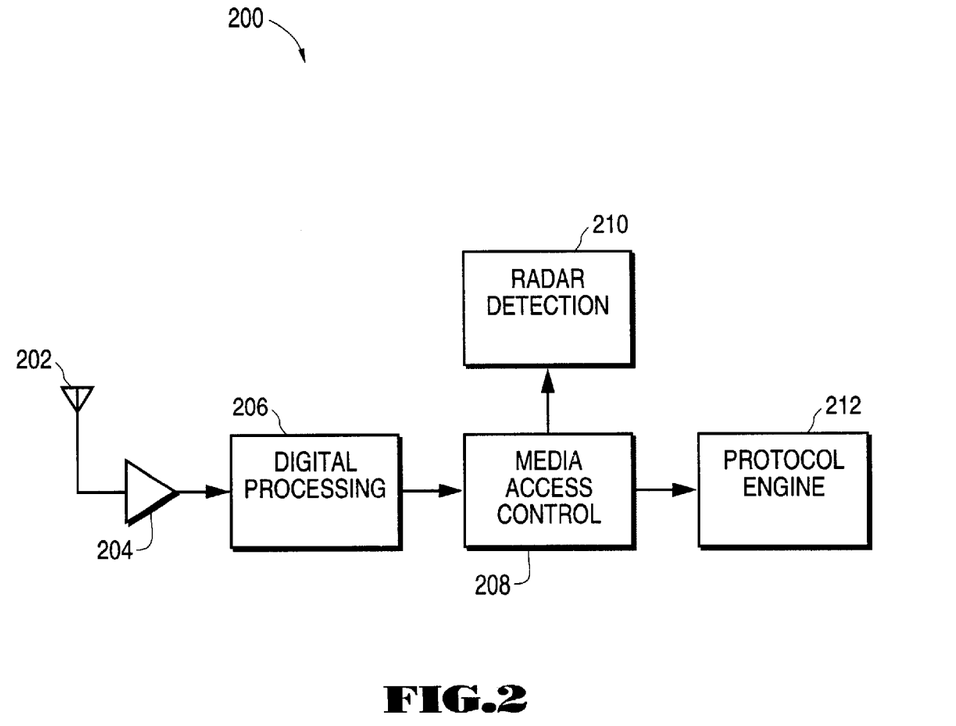
FIG. 2 is a general circuit diagram illustrating receiver circuit for a networked WLAN device that includes a radar detection circuit, according to one embodiment of the present invention.

FIG. 2 is a general circuit diagram illustrating a receiver circuit for a networked WLAN device, such as access point 102, that includes a radar detection circuit, according to one embodiment of the present invention. Input signals are received by antenna 202 and processed through a physical layer comprising amplifier 204 and digital processing circuit 206. The input signals are then processed by Media Access Control (MAC) block 208 and further processed by a protocol engine 212. A radar detection process 210 interfaces with the media access control block 208. This process can be implemented either as a software program or module executed by a processor within the wireless device, or it may be implemented as a dedicated hardware circuit coupled to the MAC layer block, or as a combination of software and hardware. The radar detection block 210 executes radar detection algorithms and processes that allow the wireless device to detect and avoid interfering radar signals.

Figure 3:
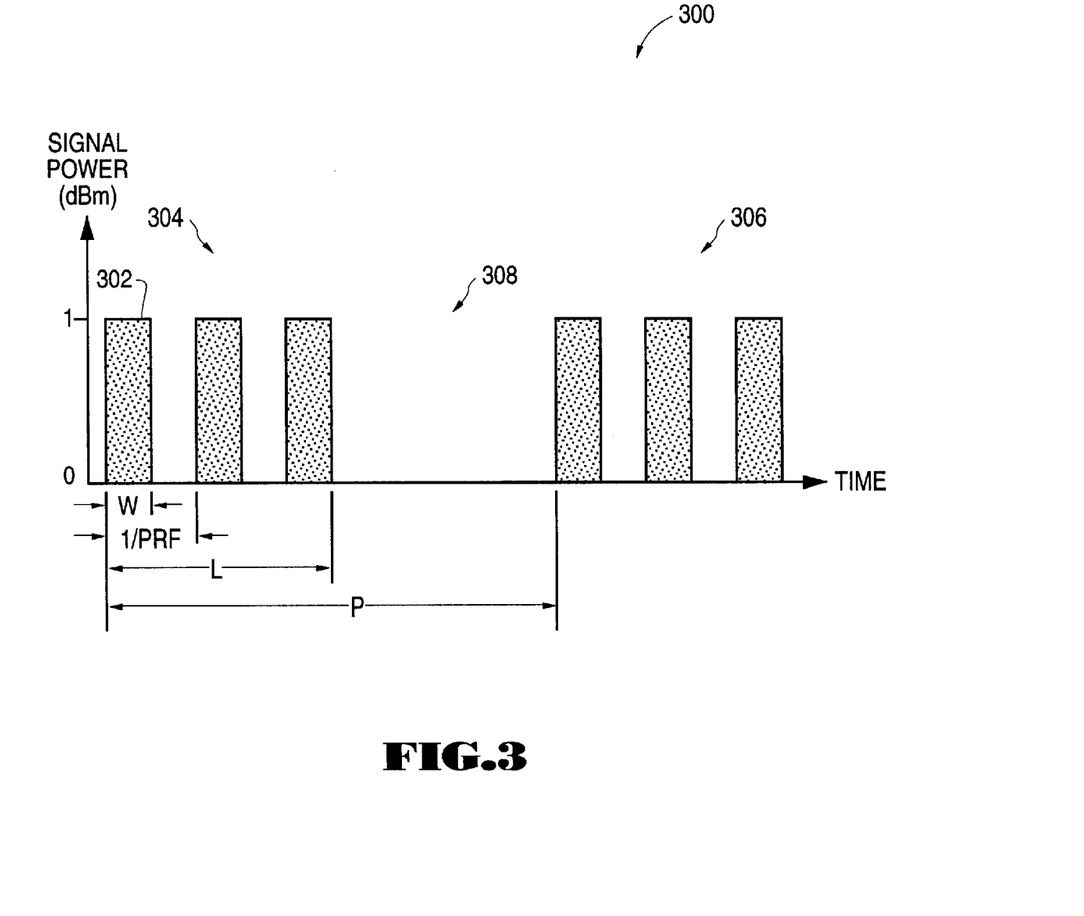
FIG. 3 is a general illustration of a typical radar signal that may be transmitted by a radar source.

FIG. 3 is a general illustration of a typical radar signal that may be transmitted by a radar source, such as radar system 107 in FIG. 1. The radar signal 300 consists of a series of pulses 302, transmitted in a series of bursts, such as first burst 304 and second burst 306. The bursts are separated by a gap 308. Each radar signal pulse 302 is a high-frequency (approximately 5 GHz) sine wave, and has a pulse duration (W) of approximately one microsecond to five microseconds. The pulse period is the time between the start of consecutive pulses and is the inverse of the pulse repetition frequency (PRF). The pulse period is typically on the order of one millisecond. The burst length (L) refers to the number of pulses in a burst or the time duration associated with the burst of pulses. The burst interval (P) is the time from the start of one burst to the start of the next consecutive burst, and is on the order of one second to ten seconds.

In one embodiment of the present invention, the radio receiver circuit 200 of the access point listens for wireless LAN data packets. It is also configured to detect radar signals, such as illustrated in FIG. 3 while it is waiting to receive and respond to normal WLAN traffic. Upon detecting an event, the receiver analyzes the incoming signal to determine whether or not it is a regular WLAN packet. Various types of unrecognized events can be detected by the receiver. These include, noise fluctuations, collisions between WLAN stations or hidden nodes, co-channel interference, and other non-LAN wireless traffic, such as cordless phone transmissions, and the like.

As can be seen in FIG. 3, radar signals possess a degree of periodicity with respect to pulses and bursts. This characteristic is used by the receiver circuit 200 to differentiate noise and other types of anomalous (non-WLAN traffic) events from radar signals. Although noise may interfere with the WLAN traffic to the same extent as incident radar signals, noise generally does not need to be avoided to the same extent as radar signals. Thus, the access point need not be configured to strictly change channels when encountering noise, as opposed to radar. To properly identify the received non-WLAN signal as radar, the event is analyzed with respect to periodicity, pulse characteristics, burst characteristics, and other similar parameters in a pattern-matching type of process to determine whether the event is a radar signal or not. Different types of radar systems and sources possess different pulse and burst characteristics. The system could be configured to classify any type of periodic event as a radar signal, or it could be configured to identify, to a certain degree of specificity, the identity of the radar source using look-up tables or profile data provided by system operators.

Figure 4:
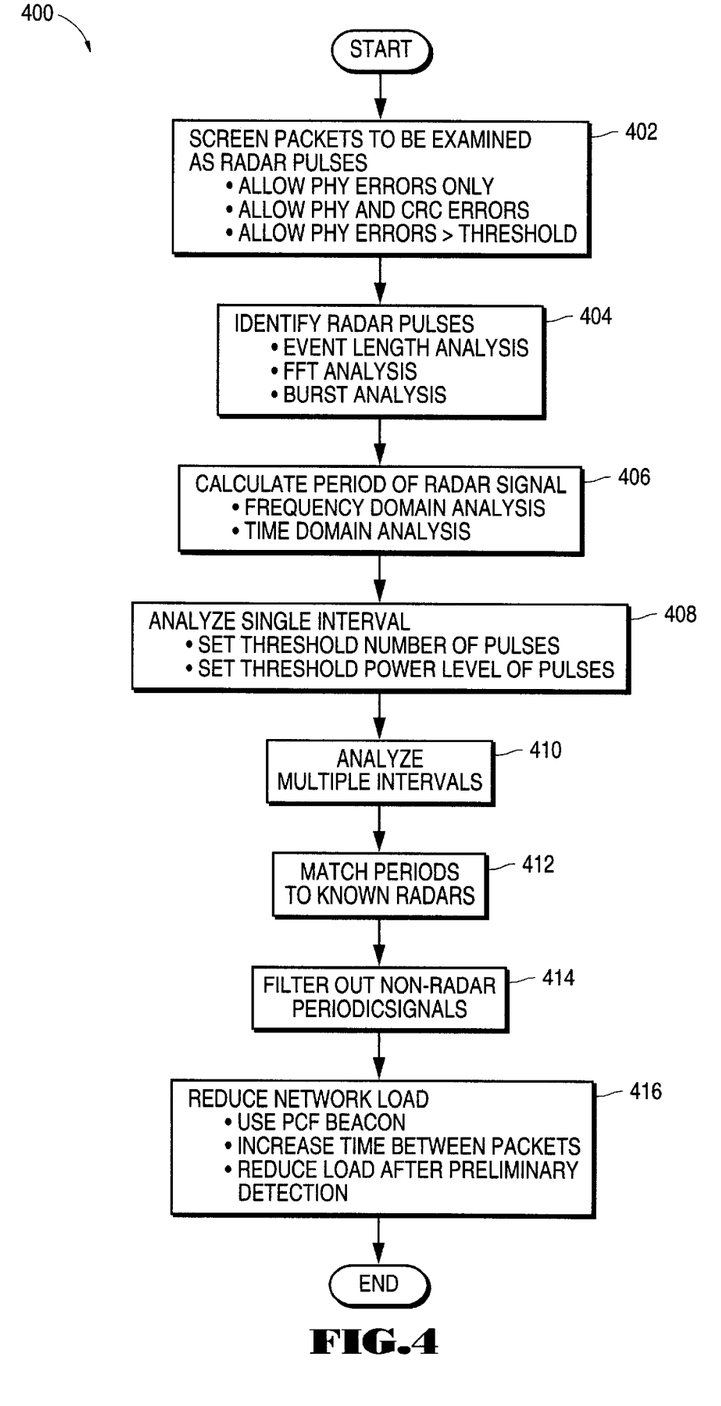
FIG. 4 is a flowchart that illustrates a method of detecting and avoiding interfering radar signals in a WLAN receiver, according to one embodiment of the present invention.

FIG. 4 is a flowchart that illustrates general process steps in a method of detecting and avoiding interfering radar signals in a WLAN receiver, according to one embodiment of the present invention. In step 402, the receiver screens packets to be examined as radar pulses. In normal operation, the access point receiver discards all packets that are not destined for the access point's MAC address and that do not successfully pass a Frame Check Sequence (FCS) error check. If the access point is set to "promiscuous mode," this screening is disabled. When in this promiscuous mode, any event that causes the receiver to sense that a signal is present above a noise floor will be reported to a software driver within the radar detection process 210. This noise floor is measured in dBm, and is an adjustable parameter. The report will include an estimate of the size of the event and an indication of when the event occurred. If the detected event is a valid LAN (e.g., 802.11a) packet with no errors, the packet is processed normally.

If the MAC circuit 208 determines that the packet has errors, such as physical (PHY) errors (severe signal errors), or CRC (Cyclical Redundancy Check) errors (bad data), it is treated as a potential radar signal, since the presence of such errors indicates that the event is most likely not a valid WLAN packet or is a valid packet that is corrupted by the presence of other signals. Depending upon the configuration and desired sensitivity of the access point receiver, the MAC circuit can be configured to allow for further analysis signals with PHY errors only, signals with either PHY or CRC errors, or signals with PHY errors only above a certain threshold. This threshold could be set to a particular value, such as −62 dBm, or it could be adapted depending on the noise in a given environment. Although CRC errors typically indicate that a valid WLAN packet simply has bit errors, a CRC error might also indicate that the LAN packet was corrupted by an interfering radar signal, and therefore provides evidence of radar interference. Thus, in certain circumstances, received signals containing CRC errors may also be passed by the MAC layer for further analysis.

The reported packets are sent from the MAC layer 208 to the radar detection process 210. The radar detection process then sorts through all of the reported events to identify radar signals, as shown in step 404 of FIG. 4. In general, the process entails first sorting valid WLAN packets. The length of the packets can be calculated based on the length and rate at which they are received. The received power is indicated, and the number of packets received can be determined. This information is then used to build a histogram describing the percentage of time the channel is occupied with valid LAN traffic at each power level. If such information is gathered on several channels, the histograms are useful for choosing the channel with the least interference from other WLAN systems.

Once the valid WLAN packets are sorted, any non-LAN packet events are sorted (binned) into rough magnitude ranges. A periodigram is then calculated for each of the magnitude bins, indicating any periodicities that are present in the events. In general, radar signals show two basic periodic natures. First, a given pulse burst (e.g., 304) has short pulses at a particular frequency (period). Second, the pulse bursts themselves have a quiet interval (e.g., gap 308) between them. Therefore the pulse bursts themselves have a periodic nature.

The output of the periodigram is examined for a number of characteristics. First it is determined whether the periods correspond to a known radar system as provided in radar look-up tables or through radar test signals. If the event does not match a known radar system, the periodicity may indicate that the source is an unknown radar system. Although WLAN traffic is generally not periodic, certain circumstances may arise when such traffic does exhibit some degree of periodicity. For example, traffic in a neighboring WLAN base station may be present an adjacent channel, in which case the receiver may trigger on these signals but does not get valid LAN packets. Or, weak signals received in the same channel may not be received as valid LAN packets, but may still register as weak events.

As an event is received, a timer circuit within the receiver 200 time stamps any pulses or spikes. In general, WLAN traffic typically includes a time code or time indicator. Radar signals, however, do not include such time information. To provide time information, a counter within the receiver assigns a time stamp to each detected event.

The receiver circuit 200 includes a Fast Fourier Transform (FFT) engine that analyzes the incoming signal to derive phase and magnitude information of the signal within fine frequency ranges. In one embodiment, the non-LAN packet events are processed with an FFT, the output of which is binned into 52 bins of 300 kHz each. Examining the contents of these bins (a spectrogram of the received signal) helps to identify and distinguish among different types of radar, such as CW (continuous wave) tone radar, and chirping radar in which the pulses are swept across a range of frequencies. In the case of radar, the power is typically concentrated in one particular bin, that is, a specific frequency. This is in contrast to normal LAN traffic in which the power level among all of the bins is roughly equal.

The packet is also analyzed to determine whether there are any spikes within the packet above a certain threshold, such as −62 dBm. A spike might indicate a radar signal that interferes with a LAN packet thereby causing CRC errors in the packet. Such a radar signature is often hard to detect and characterize. In this case, the amplitude and duration (pulse width) of the spike is analyzed to determine whether or not the interference is due to a radar pulse. Spikes within packets are also time-stamped so that the spike can be treated as a new or separate event.

Figure 5A:
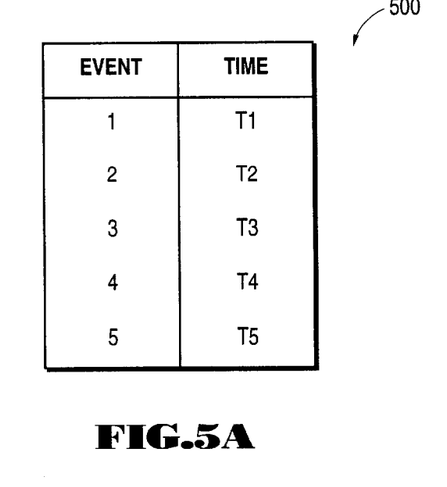
FIGS. 5A, 5B, and 5C illustrate the association of time stamps with periodic events, and a corresponding time line and frequency spectrograph for an exemplary pulse train signal.
Figure 5B:
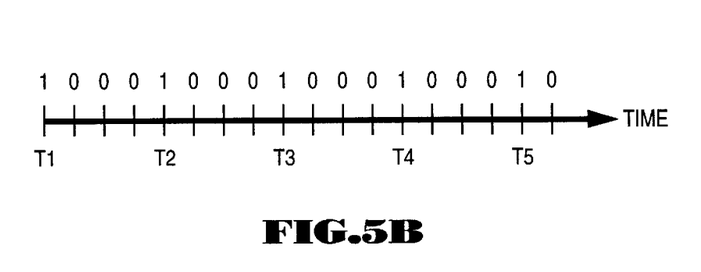
Figure 5C:
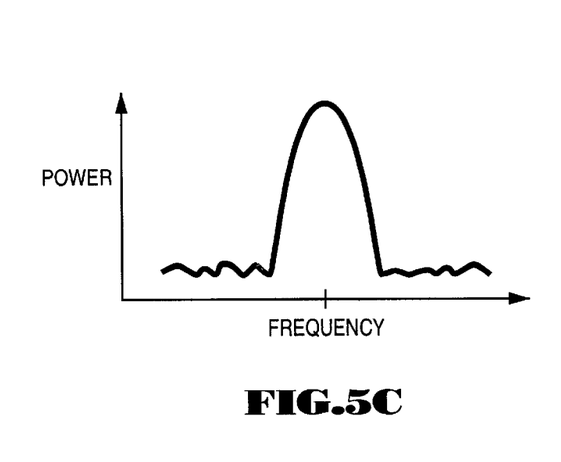

Once a particular event is determined to likely be a radar signal through an analysis of the length and magnitude of the event, the period of the signal is determined. This is illustrated as step 406 in FIG. 4. In one embodiment of the present invention, the periodic nature of the event is determined by performing Fast Fourier Transform analysis of the time stamped events. A time scale is defined and populated with the occurrence of events at particular times. An example of this process is illustrated in FIGS. 5A and 5B, in which five events are assigned time states denoted T1 through T5, as shown in Table 500. FIG. 5B illustrates a time line that is used to code the time relationship of the events. A binary value "1" is assigned to the time associated with each time stamp, indicating the occurrence of an event at that particular time. A value of "0" is assigned to all other time increments on the time line. An FFT calculation is then performed on the entire time line to determine the frequency at which the events occur. The resulting spectrograph will reveal the periodic nature of the time-stamped events. An example of a spectrograph that may correspond to the frequency timeline of FIG. 5B is illustrated in FIG. 5C.

In an alternative embodiment of the present invention, the period of the events is determined using Discrete Fourier Transform (DFT) analysis. In the DFT analysis, only the time intervals that have an event associated with it are analyzed. These are compared with specific frequency bins to determine whether or not there is any correlation. The correlation of each of the events is then added together to determine the period of the events. The DFT method is typically more efficient when the time between pulses is long (e.g., on the order of milliseconds) compared with the resolution of the time scale (e.g., on the order of microseconds). Like the FFT method, the DFT method constitutes a frequency domain technique for analyzing the periodic nature of the event.

A further alternative embodiment for determining the period of the event is a time domain analysis of the event. In this method, the interval between the first pulse and the second pulse is assumed to be the period. The subsequent pulses are then analyzed to determine whether they occur at the same period. If the subsequent pulses do not occur at the same period, the interval between next pair of pulses is then assumed to be the period against which other pulse intervals are compared. If the new assumed period is not successfully matched, the process is repeated using other intervals as the base period, until a match among the pulse intervals is found. When implemented in a digital processing system, the time domain analysis can prove to be computationally more efficient than the FFT and DFT methods. This is especially true when the pulses are spaced far apart in time relative to a fine resolution frequency domain.

In some circumstances, the resolution of the counter that time-stamps the events may not correspond to, or be as fine as the resolution of the frequency bins. For example, a timer that only has a resolution of one microsecond may not provide enough resolution to capture the exact beginning of an event. The resolution of the timer thus effects the shape of the spectrograph obtained through both frequency and time domain analysis techniques. Therefore, a mechanism is provided to allow for an error margin associated with the time stamp. For the FFT and DFT frequency domain techniques, the error margin associated with the time stamp can cause the frequency distribution curve to be shorter and wider due to small frequency shifts caused by imprecise time measurements. For these methods, the error margin is determined relative to the resolution of the frequency bins so that the relative error taken into account in determining the period of the events. Any resulting diminution in the peak of the frequency graph is then compensated for in accordance with the relative margin. Thus, if the error margin due to the time stamp resolution is known, a certain degree distortion (i.e., widening) of the frequency curve can be expected and accounted for.

In the time domain analysis technique, the method of accounting for the error margin associated with the time stamp is the association of a window with the assumed period derived by the event intervals. Thus, if the first and second intervals occur at a particular period, a plus or minus margin is associated with this period to account for the error margin of the time stamp. The interval between the next consecutive events is then compared to this period with the margin for error.

The next step in the flowchart of FIG. 4 is to analyze the periodicity of the pulses over a single time interval, step 408. The time interval is set to a value roughly the same as the period over which the pulses occur, that is, the burst length, L. This interval is then examined to determine whether a particular number of periodic pulses occurs within the interval. The search for periodicity can be performed as described previously by comparing the time between pulses. If periodic pulses are found, then it is assumed that a radar signal is present on that frequency channel. For example, the occurrence of five periodic pulses within an interval may signify a radar signal within that interval of time. A threshold value for the power level of the pulses is also defined. If frequency domain techniques are used to determine if the pulses are periodic, an FFT or DFT process is performed for each time interval as it is shifted along the time scale.

In step 410, the signal is analyzed over multiple intervals. This step compensates for any shortcomings associated with analyzing the signal over a single interval. For example, a particular interval may only include three pulses, while the threshold number of pulses is five. In this case, a radar signal would not be identified for that interval. However the next consecutive interval may include another three pulses. In this case, the number of pulses for both intervals is six, which is above the threshold number to qualify as a likely radar signal. Step 410 essentially provides a historical analysis of multiple intervals and compensates for the fact that the start and end points of the intervals are somewhat randomly defined relative to the pulse events. This step also compensates for occurrences in which radar pulses are missed, thus causing gaps in the pulse train. Radar pulses might be missed in several different types of circumstances. For example, a station generally cannot detect radar pulses when it is transmitting, or when it is concurrently receiving a strong signal. When the signal analysis is performed over multiple intervals, the threshold number of pulses per interval is reduced. If the threshold is set too low, the possibility of falsely detecting radar increases, due to the possible periodic nature of random noise or other types of incident signals. Similarly the power threshold for the pulses is also reduced as the number of intervals increases.

As can be seen in FIG. 3, there can be more than one degree of periodicity within a radar signal. There is a period associated with the pulses, as well as a period associated with the bursts of pulses, thus resulting in a "nesting" of periodicity. In one embodiment of the present invention, the single and multiple interval analysis performed in steps 408 and 410 are checked to see if there is any recurrence of pulse detection over a certain period of time. For example if a particular interval yields five pulses at a particular time, T, and then another five pulses at a time T+100 milliseconds, then it is likely that a pulse train similar to that illustrated in FIG. 3 is detected.

Once the period of the detected signal is calculated, the period can be matched to known radar signals to verify that the signal is indeed a radar signal. This is illustrated as step 412 of FIG. 4. In an embodiment of the present invention, it is assumed that any periodic event is a radar signal. This reduces the need to match the period to known radar to verify that the signal is a radar signal. Once the period is known, this information can also be used to eliminate periods that correspond to natural periods in LAN data traffic, step 414. Although WLAN traffic, such as 802.11 traffic is technically random, and therefore non-periodic, certain natural periods can arise depending upon the type of traffic that is transmitted. If the period of the detected event matches the known natural period of the LAN traffic, the signal can be classified as LAN traffic as opposed to radar traffic that should be strictly avoided.

A second method of avoiding radar signals that can constitute a secondary check for the period determination method described above is to count the number of PHY error events that occur in a given period of time. In this method, a threshold number of PHY errors is set for a given time interval. As a signal is received by the receiver, the number of PHY errors is counted. If the number of detected PHY errors occurs in a particular period of time, it is assumed that the signal is a radar signal.

Known Period Detection

As described above, one method of determining the period of the radar signal employs a time domain analysis in which the interval of time between two consecutive pulses is iteratively compared among different pairs of pulses, as shown in step 406 of FIG. 4. The following discussion provides a detailed description of the implementation of providing known period detection according to a preferred embodiment of the present invention. It should be noted that although specific code and programming structures may be used to describe the method, these are provided for purposes of illustration, and other program structures may be used. For this embodiment, the radar detection process 210 detects the presence of radar signals using well-known patterns of pulse repetition. The duration of time between two consecutive pulses is determined and the process searches for a minimum number of error events that fall on the known time boundaries.

In one embodiment, the radar detection process 210 includes an algorithm that uses hard-coded data structures to hold information about the radar patterns (PPS) that it is looking for. Event information is stored in an array as time deltas between consecutive events. A search is performed every time a new event is added to the array (once enough data points are collected). A time delta is considered to match the period of a particular radar pattern if the product of frequency, i.e., PPS (pulses per second) and time delta (in microseconds) is a multiple of 1,000,000. This value is called "tfValue" in the routine provided below. The resulting value is compared against its rounded value with desired percentage margin. This principle is used at several places in the algorithm. The advantage to this approach is that if pulses in the pulse sequence were missed, the periods between the remaining pulses will appear as an integer multiple of tfValue. Therefore, it is easy to check if the pulses are within the margin and therefore periodic, even if some pulses are missing from the pulse stream.

The receiver circuit 200 indicates a PHY error when interference such as a radar pulse hits the receiver. It may result in indicating a zero length frame to the host if the interference activates the receiver. Any interference that hits the receiver while it is receiving the payload of the frame causes a CRC error. The hardware generates an interrupt to the host on every received frame that has an error. The interrupt handler, "ar5hwcEndIn( )" reads the current timestamp from the hardware registers. This may be in microseconds. Alternatively, the timestamp value may be placed in the receive descriptor status field by the physical layer of the receiver, in which case the time stamp is generally more accurate. Reading the timestamp in the interrupt handler is acceptable as long as the interrupt latency is approximately the same for all events. Hence, the timestamp is captured at the highest interrupt priority.

The algorithm uses timestamps only for PHY errors and not for CRC errors. Since a CRC error can be caused by interference anywhere in the middle of a frame (stretching across a few milliseconds), their timestamps generally do not closely represent timing of the interference. PHY error timestamps are entered in the event array at system task priority by the "ProcessRxInterrup( )" process.

The following software routine provides an example of the radar detection algorithm utilizing time domain frequency analysis. This algorithm is based on hierarchically searching subsets of possible radar frequencies. For example, in the first pass the possible frequencies are stepped in large steps. For example, all frequencies from 300 to 4000 Hz are checked by stepping the frequency by 100 Hz each time. Because the steps are large, the allowable margin in the tfValue must be large to detect any pulse repetition frequencies that lie between the coarse steps. Once a suspected regular pulse period is found, for example between 500 and 600 Hz in this example, that range is then more finely scanned, with a tighter margin on the tfValue. In this case the second scan might run from 500 to 600 Hz in 10 Hz steps with the tfValue margin reduced by a factor of 10 by the first sweep. This hierarchical search can be continued until the desired tfValue margin is achieved. Once achieved, the events are known to be periodic within a given accuracy, and the frequency of the events is determined with the desired accuracy.

```
for each pps in PPS_ARRAY
    for each event in event array
        discard first few events that are outside burst time
    delta
        tfValue = timedelta * pps
        store it in pulse1 array
    for each event in pulse1 array
        if difference bet rounded and original tfValue is
        within wideMargin
            store it in pulse array
    if pulse has minimum no. of pulses
        // Now use narrow margin for small variations of pps
        around the current pps value.
        for each finer increment within pps
            repeat the above loops, but for narrow margin.
            if pulse has minimum no. of pulses
                radar signal is detected
```

The program loops include filters to remove undesired data points in order to reduce the false alarm probability. If the tfValue of a datapoint is zero, it is less than 50% of the period that is being looked for, and such points are discarded. If tfValue is not within the margin but it is off by more than 30%, it counts as a mismatch. If the number of mismatches is equal to or exceeds the number of matches, it is a susceptible event sample. If tfValue is not 1 million, but is instead a multiple of a million (2, 3, 4 million, etc.), it is likely that the receiver dropped some interference events or this pattern may match a PPS that is one-half or one-third of the current PPS. If more than half of data points exhibit this characteristic, the sample is discarded.

Figure 6:
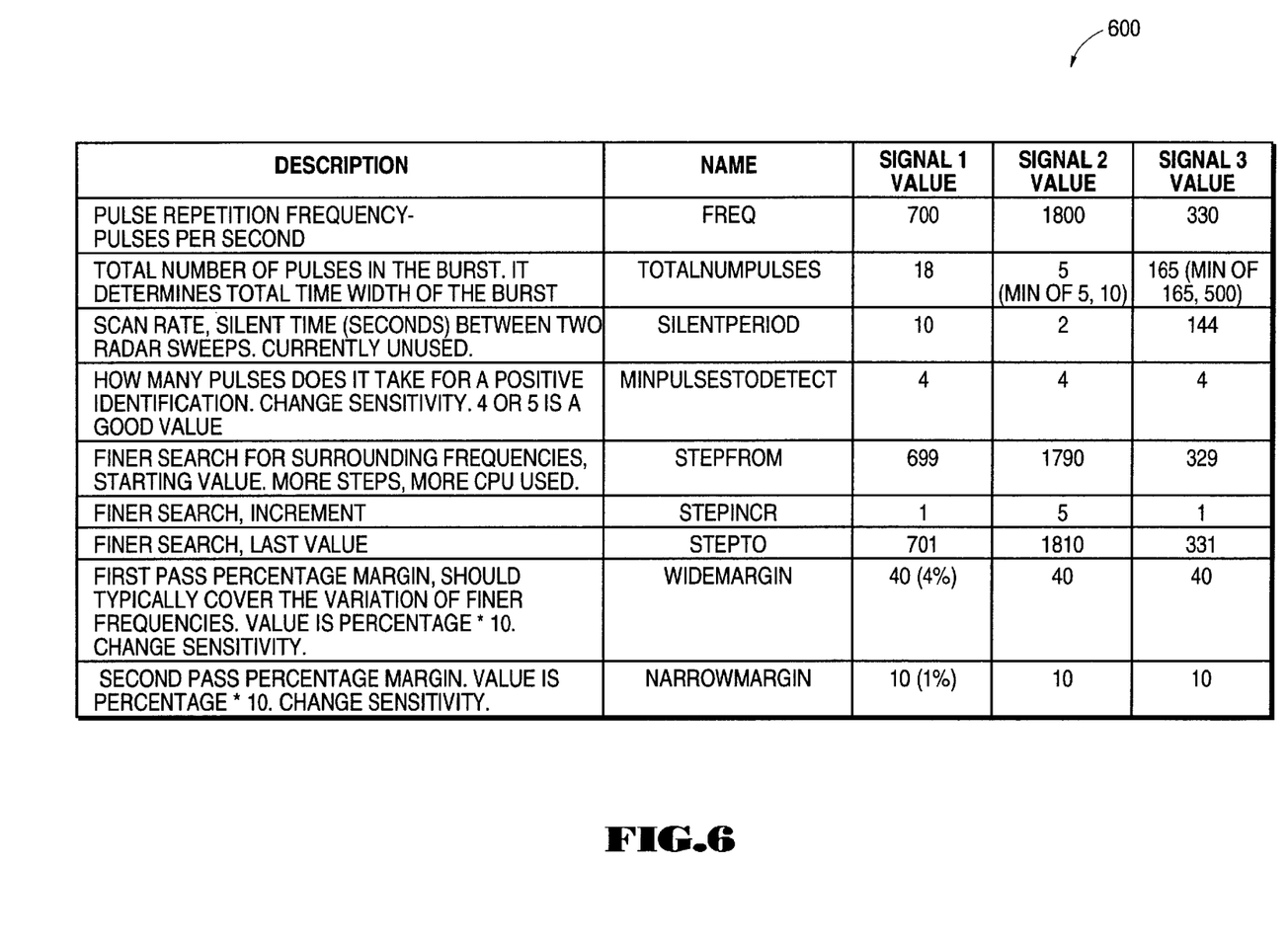
FIG. 6 is a table of parameters and exemplary values for a process of calculating the periodicity of radar signal patterns, according to one embodiment of the present invention.

FIG. 6 is a table of parameters and exemplary values for a process of calculating the periodicity of radar signal patterns, according to one embodiment of the present invention, and is used to represent the radar signal patterns. The frequency, totalNumPulses and silentPeriod parameters are taken from the definition of that signal like representative radar. The rest of the parameters can be used to tune the sensitivity of the algorithm, false alarm probability and variation of frequencies. Most of these parameters can impact the performance of the system. The code excerpt below illustrates a programming structure that utilizes the data of table 600, according to one embodiment of the present invention.

```
// Information about radar patterns
typedef struct ppsArray
{
    A_INT32  arraySize;
    A_INT32  count;
    struct ppsInfo
    {
        A_INT32  freq;             // value of pps
        A_INT32  totalNumPulses;   // burst size
        A_INT32  silentPeriod;// scan rate in seconds
        A_INT32  minPulsesToDetect;//min pulses for ID
        A_INT32  stepFrom;// finer search from this pps
        A_INT32  stepIncr;// with this increment
        A_INT32  stepTo;           // to this pps
        A_INT32  wideMargin; //wide margin%*1000 for
first search
        A_INT32  narrowMargin; //narrow margin%*1000 for
finer search
    } info[PPS_ARRAY_SIZE];
} PPS_ARRAY;
```

The initRadarDetect( ) initializes the event array and computes the maximum burst time of all the PPS's. It is used to age out those events from the array that fall outside this time delta. It also enables promiscuous mode and zero length frame indication in the hardware of circuit 200.

The following routine initiates processing of PHY errors at runtime. It is called in the background while other tasks are running. The access point initialization code goes through the basic channel initialization and waits for one minute, and keeps checking the flag if radar is detected.

```
ar5hwcEndInt ( ) looks for PHY error interrupt. Reads timestamp and stores it locally.
ProcessRxInterrupt ( )
    recordRadarEvent ( ) to enter the time delta in event array
    processRadarEvents ( ) to perform required processing
        radarEventAge ( ) to filter out events outside max burst duration
        checkRadarPattern ( )
            knownPeriod ( ) - Look for known radar pattern
                apReboot () - Reboot the AP on radar detection (optional)
```

The apReboot could be substituted with marking a channel as unusable due to the presence of radar, and then randomly choosing another channel to begin sampling to determine if radar is present. Detecting radar during network initialization may be easier because there is no network traffic flowing at that time that could obscure radar pulses. Therefore the thresholds and listening periods can be adjusted accordingly.

Reduction of Network Load

During high traffic conditions, in which the access point is transmitting and receiving a large percentage of the time, the radar detection system may not be able to adequately detect and identify all possible radar interference events. In one embodiment of the present invention, the radar detection process is used in conjunction with processes that reduce the network load of the access point by increasing the amount of free air time. The increased free air time increases the likelihood that radar pulses will be detected by the receiver. This is illustrated as step 416 in FIG. 4. The network load reduction techniques are closely related to the Media Access Control mechanisms provided in the 802.11 standard.

Figure 7:
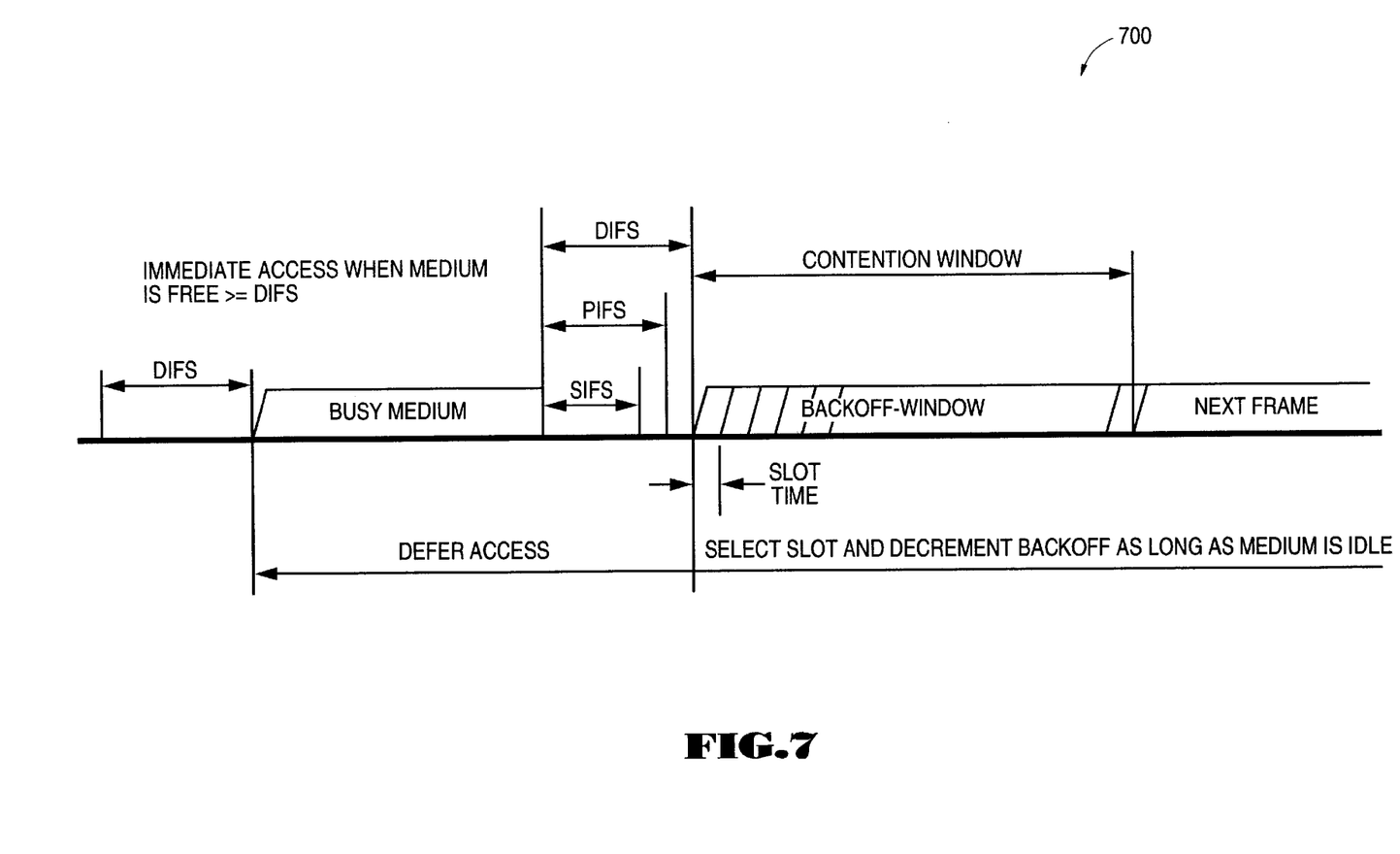
FIG. 7 illustrates a typical access sequence for a Distributed Coordination Function (DCF) media access mechanism that can be used with embodiments of the present invention.

One media access mechanism provided for in the 802.11 standard is the Distributed Coordination Function (DCF), which is commonly known as "listen before talk." For DCF, the random access is slotted, with a random back-off time selected within a contention window following a busy medium condition. In addition, all directed traffic uses immediate positive acknowledgment (ACK frame) where re-transmission is scheduled by the sender if no ACK is received. FIG. 7 illustrates a typical access sequence for a DCF media access mechanism that can be used with embodiments of the present invention. A Short Inter-Frame Spacing (SIFS) is used between a packet and its acknowledgement (ACK). After the acknowledgement packet, other receivers wait for the period of a Distributed Inter-Frame Space (DIFS), as well as a random portion of the contention window (CW). For the DCF method, one way to reduce the network load is to increase the time between packets by increasing the contention window. This increases the time that nodes must wait before transmitting and thus reduces the load on the network. Similarly, SIF and DIF periods can be changed to create more free network time. An enhanced DCF method in which nodes are given different contention windows based on the priority of traffic can also be used with the radar detection system.

Another type of media access mechanism provided for in the 802.11 standard is the Point Coordination Function (PCF). The PCF access mechanism is based on polling by the access point. In this mode, the access point controls which nodes transmit and when they transmit. The access point first issues a PCF beacon, which announces the beginning of a polling period and informs all other nodes that they must wait until they are polled before transmitting. After that, the access point can commence polling of the nodes. Polls can be combined with data payloads, as well as with acknowledgments of previous packets. Once polled, the nodes can respond with combined data and acknowledgements. Thus, the PCF mechanism is a permission-based mechanism in which the access point explicitly allows nodes to transmit using the PCF beacon. The gaps between packets in this mode are generally SIFS or PIFS, although the access point can always leave the medium idle for any length of time it chooses.

During a PCF polling period, if the access point does not poll a station, there should be no network traffic, thus providing a period of quiet time on the network. In one embodiment, the access point is configured to send a PCF beacon on a periodic basis, such as once every 100 milliseconds. During this time, in which the network traffic should be ceased, the access point can perform a radar detection process. For this embodiment, the access point first sends a PCF beacon, then executes a radar detection cycle. At the end of the radar detection cycle, the access point can then proceed with normal PCF polling. This allows network traffic to flow at a regular pace, albeit perhaps at a reduced throughput rate, rather than being completely stopped for a period of time. For the PCF method, the SIF and DIF periods can be changed to create more free network time.

In an alternative embodiment, the access point can be configured to hold traffic at the access point prior to transmission, or to command the nodes to hold traffic prior to transmission. For this embodiment, the access point transmits a command instructing the nodes to not transmit again for a certain period of time after a previous transmission. This serves to slow traffic from the nodes at a rate corresponding to the hold period. One method of implementing this mechanism is for the access point to hold its own acknowledgment and/or data packets. This causes the transmitting nodes to use a larger contention window. In addition, higher level protocol engines to assume that there is heavy traffic on the network and slow the traffic accordingly. The access point could achieve a similar result by jamming the network with traffic to create collisions. This forces the contention window to be increased, since it appears that there are too many nodes for the number of available slots.

In a further alternative of the present invention, the network load is reduced by the access point after a preliminary detection of radar signals is made. For this embodiment, the pulse number threshold is set at a low value, for example three pulses to trigger the detection process. This allows for the detection of almost all possible radar signals, as well as the possibility of false positive readings. Upon the detection of an event, the network load is reduced temporarily using one of the above described methods, such as increasing the use of the PCF beacon to clear traffic from the network. During the time of ceased or reduced traffic, the threshold is set to a higher pulse number value, for example eight pulses, and the radar detection process is then re-executed. With the higher threshold, the possibility of false positive readings is decreased. For the preliminary detection period of this embodiment, the method of detecting radar signals could be a simple check of all pulses above a particular power level, as described previously, as opposed to a full profile analysis using the length of the event and an analysis of the periodicity of the event. Once the preliminary detection is performed at the lower threshold number, the second detection process for the higher number of pulses is then performed using a determination of the periodicity.

In one embodiment of the present invention, the radar detection process is executed only at the access point. If the access point detects the presence of a radar signal, it will change channels. When on the new channel, it will listen to see if there are radar signals on that channel. If not, it begins sending beacons on that new channel. Otherwise it switches channels again and repeats until it finds a channel with no radar signals. The nodes (mobile terminals) meanwhile will have lost the access point and will eventually search to associate. They will either find another access point with which they can associate, or will eventually find the access point with which they were originally associated. Although this channel hop is not graceful, it is expected to be a relatively rare occurrence. Most of the radar sources are fixed so they only need to be found and avoided once, typically during the power-on sequence for the access point. It should be noted that, in general, all nodes are constrained to passive scanning for access points. Active scanning, in which the nodes launch probe request packets before hearing an access point would not be allowed. This prevents a station from interfering with radar systems while trying to locate an access point. Passive scanning is fully supported by the 802.11 protocol, although it is generally considered slower to associate with this approach.

In an alternative embodiment, the access point could delegate the radar detection process to one of the nodes. For this embodiment, the access point sends a command to a particular node to perform a radar detection process and report the results back to the access point so that the access point can switch channels to a free channel. In this case, the node could use any of the previously described radar detection mechanisms to find the presence of radar and report that to the access point.

Uniform Spread of the Loading

Embodiments of the present invention relating to radar detection and avoidance also work in conjunction with methods to provide a uniform spread of the loading of the equipment across a minimum number of channels in the 5 MHz space. For example, under the 802.11 standard, DFS equipment is required to spread the load across a minimum of 14 channels (or 330 MHz), or 255 MHz in the case of equipment used only in the band 5470 MHz to 5725 MHz to facilitate sharing with satellite services.

In one embodiment, the access point circuit of FIG. 2 operates from 5150–5350 MHz. Therefore, the spread will be across 200 MHz and not 330 MHz. However, since the intent of spreading is to minimize the power spectral density in any given bandwidth, the system compensates by using reduced power to make up for having less bandwidth to spread over. The commensurate power reduction would be approximately 2.2 dB.

Additionally, an access point that profiles all channels would need to follow this algorithm for selecting a channel to use. First, any channels in which radar signals are suspected would not be used in any circumstances. Second, the access point would avoid any channels that are already heavily loaded with WLAN traffic. Finally, among the remaining channels that have neither radar nor WLAN traffic, the access point would choose randomly. This prioritization and method for final selection insures the most uniform spreading of the traffic while minimizing potential interference to radar systems.

By actively searching for and identifying radar signals, the access point provides the best possible radar avoidance. Detection can be further improved over time if the periodicities of more radar systems are published. However, even radar systems that are unknown can be detected as long as they have a periodic nature. The radar-detection algorithm and process described herein allows radar detection to be performed periodically during normal network operation, and possibly even as live traffic is being handled. Trading power for spreading bandwidth is reasonable under these circumstances because the resulting power spectral density will be the same. Moreover, it allows the construction of products that operate only in the lower band. Such products would be directly compatible between present U.S. and European standards, since the 5150–5350 kHz band has been allocated in both domains with similar power limits.

Although embodiments of the present invention have occasionally been discussed in the context of particular 5 GHz WLAN standards, such as the U.S. 802.11 standard, it should be understood that alternate embodiments can be used in systems that conform to other standards, such as the European HIPERLAN (High Performance Radio Local Area Network) standard. Some of these standards include their own propositions and requirements for radar detection and avoidance.

For example, present HIPERLAN2 radar detection capabilities presently being proposed by the ETSI BRAN standards committee are generally not as robust as those described herein. These methods are based solely on measuring if power above a certain threshold was ever received. This method has a number of drawbacks. First, the threshold must be set quite high in order to limit the chance of false positives in radar detection; second, even with high thresholds the chances of false positives is significant considering overlapping cells that may be operating co-channel during the measurement period; and third, such a brute force method cannot be used while live traffic is being serviced. Therefore network designers must either sacrifice throughput or spend a small fraction of the time searching for radar signals. Since some of the radar signals have long periods, this tradeoff may be hard to manage.

The analysis of the periodicity of the received event can be used to extend the radar detection capability of such HIPERLAN systems. In addition, this method can be used in conjunction with certain features unique to HIPERLAN systems. For example, HIPERLAN2 provides the facilities for an access point to command a station to measure a different channel and report the result. The implication of this feature is that if for some reason the access point cannot hear the radar, but the mobile station can, the channel will still be rejected. Although such a situation might be rare since the radar signals will likely be coming from a much farther distance than the distance between stations in a WLAN cell, it does provide a method for an access point to delegate the radar detection and avoidance mechanism to other nodes.

In addition, the radar detection system can be extended to allow for the generation of management packets from the access point that could be interpreted as commands to nodes to measure the traffic on particular channels. The stations would then report the results back to the access point. Similarly, management packets could be defined for the result reports, including indications of radar, 802.11a traffic, and other WLAN traffic.

The system could also be extended to allow nodes and access points to generate histograms that show the percentage of time on the channel that various types of traffic were present in relation to the signal power level. This provides a measure of time occupancy versus signal strength. The generation of this type of histogram relies upon the measurement of duration of non-LAN traffic events. Such duration information can also be derived for LAN traffic events from the rate and length information for each packet. A process then generates a histogram for non-LAN traffic based on the number of events detected by the chip.

New management packets and new elements in beacons can be specified to announce an upcoming channel change. This allows the channel switch to be much quicker, without breaking associations. Additionally, all nodes will know when to switch, and to which channel they should switch.

In the foregoing, a system has been described for detecting and avoiding interfering radar signal in WLAN devices operating in the 5 GHz frequency space. Although the present invention has been described with reference to specific exemplary embodiments, it will be evident that various modifications and changes may be made to these embodiments without departing from the broader spirit and scope of the invention as set forth in the claims. Accordingly, the specification and drawings are to be regarded in an illustrative rather than a restrictive sense.

What is claimed is:

1. A method of detecting radar signals in a wireless network device comprising the steps of:
   receiving a plurality of signal pulses as detected events;
   time stamping the events upon reception to produce a time stamp for an event of the detected events;
   eliminating any detected events that correspond to network traffic;
   determining whether any non-eliminated events of the individual detected events correspond to radar signals by examining at least one of: a pulse repetition frequency, a pulse period, or a number of pulses in a pre-defined time period, wherein determining a period of the event comprises performing a time domain analysis of the non-eliminated events;
   determining a first time interval between a first pulse and second pulse of the event;
   assuming that the first time interval represents the period of the event; and
   comparing the first time interval with a second time interval between the second pulse and a third pulse of the event to determine whether the first and second time intervals match to within an error factor associated with the time stamp for each detected event.

2. The method of claim 1 further comprising the steps of:
   assuming a pulse repetition frequency to create an assumed frequency;
   multiplying a time interval between the pulses by the assumed frequency to create a result; and
   determining if the result is within a pre-defined margin of being an integer value.

3. The method of claim 2 in which an initial assumed frequency is obtained by inverting the time interval between the pulses.

4. The method of claim 2 in which a plurality of assumed frequencies is created by assuming different pulse repetition frequencies.

5. The method of claim 3 further comprising the steps of:
   initially selecting widely spaced frequencies and wide margins;
   determining when a positive result is found; and
   subsequently selecting finely spaced frequencies and margins to confirm the presence of a radar signal.

6. A device coupled to one or more remote terminals over a wireless network, comprising:
   a receiver circuit for receiving network data traffic as an input signal from the one or more remote terminals;
   a media access control circuit coupled to the receiver circuit, and configured to detect an error contained in the network data traffic received by the receiving circuit, and to classify the error based on a pre-defined error type;
   a radar detection circuit coupled to the media access control circuit and configured to receive the input signal if the error contained in the input signal is of a first error type, the radar detection circuit comprising,
      a first process receiving a plurality of signal pulses as detected events, wherein each pulse is considered an event, and the events appear as a first event burst followed by one or more subsequent event bursts,
      a second process eliminating any detected events that correspond to network traffic, and
      a third process determining whether any non-eliminated events of the individual detected events correspond to radar signals by examining at least one of: a pulse repetition frequency, a pulse period, or a number of pulses in a pre-defined time period,
   a time stamp circuit assigning a time stamp to each event that is above a pre-defined power threshold;
   an event analysis circuit defining a threshold number of events within a time interval, above which the events are considered to be radar events, wherein the period of the event bursts is determined by a time domain analysis process performed on the event bursts as detected by the event analysis circuit to determine a pulse burst period, and wherein the time domain analysis process determines a first time interval between a first pulse burst and second pulse burst;

assumes that the first time interval represents the period of the event; and compares the first time interval with a second time interval between the second pulse burst and a third pulse burst of the event to determine whether the first and second time intervals match to within an error factor associated with the time stamp.

7. The device of claim 6 further comprising:

a fourth process assuming a pulse repetition frequency to create an assumed frequency;

a fifth process multiplying a time interval between the pulses by the assumed frequency to create a result; and a sixth process determining if the result is within a pre-defined margin of being an integer value.

8. The device of claim 7 in which a plurality of assumed frequencies is created by assuming different pulse repetition frequencies.

9. The device of claim 8 further comprising:

a seventh process for initially selecting widely spaced frequencies and wide margins are used;

an eighth process determining when a positive result is found; and a ninth process for subsequently selecting finely spaced frequencies and narrow margins to confirm the presence of a radar signal.

10. A method of identifying radar signals in a network device coupled to one or more remote terminals over a wireless network, comprising the steps of:

receiving an input signal comprising a plurality of pulses as detected events;

determining whether the detected events correspond to expected network traffic;

assigning a time stamp to each event of the detected events that is above a pre-defined power threshold;

determining a first time interval between a first event and second event;

assuming that the first time interval represents the period of the events; and comparing the first time interval with a second time interval between the second event and a third event to determine whether the first and second time intervals match to within an error factor associated with the time stamp.

11. The method of claim 10 further comprising the step of defining a period of the events to correspond to a time interval between successive pulses that matches the first or the second time intervals.

12. The method of claim 11 further comprising the steps of:

defining periodic time intervals;

defining a threshold number of pulses within each time interval; and defining a threshold power level for the pulses within the time interval.

13. The method of claim 12 further comprising the step of determining whether the number of pulses above the threshold power level within a time interval meets or exceeds the threshold number of pulses.

14. The method of claim 13 further comprising the step of determining whether the number of pulses above the threshold power level within two or more time intervals meets or exceeds a threshold number of pulses, if the number of pulses within one interval does not meet the threshold number of pulses for a single interval.

15. The method of claim 11 wherein the detected event represents an input signal exhibiting physical errors beyond a pre-defined tolerance.

16. The method of claim 10 further comprising the step of matching the period of the event to known radar sources.

17. The method of claim 10 further comprising the step of switching an input channel of the network device to a different frequency band to avoid interference with the input signal.

18. The method of claim 10 further comprising the step of reducing network traffic for the network device using one of: a beacon signal transmitted to one or more remote terminals coupled to the network device causing the one or more terminals to suspend transmission to the network device, and a jamming signal operable to lengthen a contention period of time for prioritizing network traffic from the one or more remote terminals.

19. The method of claim 10 wherein the network device comprises an access point station coupled to a 5 GHz radio network, and wherein the network utilizes one of: 802.11 network protocol and HIPERLAN network protocol.

* * * * *